(12) United States Patent
Chung et al.

(10) Patent No.: US 10,459,595 B2
(45) Date of Patent: Oct. 29, 2019

(54) METHOD AND APPARATUS FOR PROCESSING TOUCH INPUT

(71) Applicant: Samsung Electronics Co., Ltd., Suwon-si, Gyeonggi-do (KR)

(72) Inventors: Seung Min Chung, Seoul (KR); Hye Soon Jeong, Chilgok-gun (KR); Dae Sik Hwang, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 14/843,117

(22) Filed: Sep. 2, 2015

(65) Prior Publication Data

US 2016/0062556 A1 Mar. 3, 2016

(30) Foreign Application Priority Data

Sep. 2, 2014 (KR) .......................... 10-2014-0116324

(51) Int. Cl.
| | |
|---|---|
| *G06F 3/01* | (2006.01) |
| *G06F 3/0481* | (2013.01) |
| *G06F 3/041* | (2006.01) |
| *G06F 3/0484* | (2013.01) |
| *G06F 3/0488* | (2013.01) |

(52) U.S. Cl.
CPC ............ *G06F 3/0481* (2013.01); *G06F 3/017* (2013.01); *G06F 3/0416* (2013.01); *G06F 3/04847* (2013.01); *G06F 3/04883* (2013.01); *G06F 3/04886* (2013.01); *G06F 3/0488* (2013.01); *G06F 2203/04104* (2013.01)

(58) Field of Classification Search
CPC combination set(s) only.
See application file for complete search history.

(56) References Cited

U.S. PATENT DOCUMENTS

| | | | |
|---|---|---|---|
| 8,195,254 B2 | 6/2012 | Oksman et al. | |
| 8,547,347 B2 | 10/2013 | Chiang et al. | |
| 8,644,885 B1* | 2/2014 | Tseng .................... | G06F 1/1637 |
| | | | 455/566 |
| 8,654,095 B1 | 2/2014 | Cho et al. | |
| 8,934,949 B2 | 1/2015 | Yeo et al. | |
| 9,910,521 B2* | 3/2018 | Ahn ...................... | G06F 3/0488 |

(Continued)

FOREIGN PATENT DOCUMENTS

| | | |
|---|---|---|
| EP | 2077490 A2 | 7/2009 |
| EP | 2434385 A1 | 3/2012 |

(Continued)

OTHER PUBLICATIONS

European Search Report, dated May 23, 2017, issued in the European Application No. 15 183 452.0.

(Continued)

*Primary Examiner* — Hien L Duong
(74) *Attorney, Agent, or Firm* — Jefferson IP Law, LLP

(57) ABSTRACT

An electronic device is provided. The electronic device includes a display having a first area and a second area functionally divided, a determination module configured to determine a location of a touch input, and a processing module configured to process the touch input based on a state of the electronic device, if the location of the touch input is in the second area.

17 Claims, 14 Drawing Sheets

(56) References Cited

U.S. PATENT DOCUMENTS

| | | | |
|---|---|---|---|
| 2009/0006991 A1* | 1/2009 | Lindberg | G06F 3/04817 715/763 |
| 2009/0174679 A1 | 7/2009 | Westerman | |
| 2010/0079392 A1 | 4/2010 | Chiang et al. | |
| 2010/0240415 A1* | 9/2010 | Kim | G06F 3/03547 455/565 |
| 2011/0151935 A1 | 6/2011 | Oksman et al. | |
| 2012/0023459 A1 | 1/2012 | Westerman | |
| 2012/0075212 A1 | 3/2012 | Park et al. | |
| 2012/0284673 A1* | 11/2012 | Lamb | G06F 3/04883 715/863 |
| 2013/0033434 A1 | 2/2013 | Richardson et al. | |
| 2013/0076612 A1* | 3/2013 | Myers | G06F 1/1626 345/156 |
| 2013/0154926 A1* | 6/2013 | Kim | G06F 9/00 345/157 |
| 2013/0207913 A1* | 8/2013 | Takashima | G06F 3/044 345/173 |
| 2013/0212483 A1 | 8/2013 | Brakensiek et al. | |
| 2013/0222287 A1 | 8/2013 | Bae et al. | |
| 2013/0234982 A1* | 9/2013 | Kang | G06F 3/044 345/174 |
| 2013/0271447 A1 | 10/2013 | Setlur et al. | |
| 2013/0300697 A1 | 11/2013 | Kim et al. | |
| 2013/0328793 A1* | 12/2013 | Chowdhury | G06F 3/041 345/173 |
| 2013/0339720 A1* | 12/2013 | Levy | G08G 1/147 713/100 |
| 2014/0033142 A1* | 1/2014 | Ding | G06F 3/04883 715/867 |
| 2014/0109000 A1 | 4/2014 | Chiang et al. | |
| 2014/0109217 A1* | 4/2014 | Park | G06F 21/44 726/17 |
| 2014/0118271 A1 | 5/2014 | Lee et al. | |
| 2014/0139984 A1 | 5/2014 | Jung | |
| 2014/0141841 A1 | 5/2014 | Yeo et al. | |
| 2014/0189608 A1* | 7/2014 | Shuttleworth | G06F 3/0484 715/863 |
| 2014/0285449 A1 | 9/2014 | Cho et al. | |
| 2014/0285450 A1 | 9/2014 | Cho et al. | |
| 2014/0298268 A1* | 10/2014 | Kang | G06F 3/04847 715/841 |
| 2014/0325195 A1* | 10/2014 | Xu | H04M 1/67 713/1 |
| 2015/0015525 A1 | 1/2015 | Cho et al. | |
| 2015/0095826 A1* | 4/2015 | Ahn | G06F 3/0488 715/769 |
| 2015/0169071 A1* | 6/2015 | Jitkoff | G06F 3/04883 715/863 |
| 2015/0242006 A1 | 8/2015 | Kim et al. | |
| 2015/0249733 A1* | 9/2015 | Miura | H04M 1/72563 455/566 |
| 2015/0253891 A1 | 9/2015 | Westerman | |
| 2016/0026323 A1* | 1/2016 | Wu | G06F 3/0416 345/173 |
| 2016/0070338 A1* | 3/2016 | Kim | G06F 3/0488 345/173 |
| 2017/0123590 A1* | 5/2017 | Han | G06F 3/0418 |

FOREIGN PATENT DOCUMENTS

| | | |
|---|---|---|
| EP | 2650768 A1 | 10/2013 |
| KR | 2014-0054746 A | 5/2014 |

OTHER PUBLICATIONS

European Summons to Attend Oral Proceedings dated Sep. 4, 2019, issued in European Patent Application No. 15183452.0.

* cited by examiner

METHOD AND APPARATUS FOR PROCESSING TOUCH INPUT

CROSS-REFERENCE TO RELATED APPLICATION(S)

This application claims the benefit under 35 U.S.C. § 119(a) of a Korean patent application filed on Sep. 2, 2014 in the Korean Intellectual Property Office and assigned Serial number 10-2014-0116324, the entire disclosure of which is hereby incorporated by reference.

TECHNICAL FIELD

The present disclosure relates to technology for preventing an unintended touch input occurring when a user utilizes an electronic device.

BACKGROUND

In general, an electronic device such as a smart phone or a tablet may be equipped with a touch screen panel (TSP). The electronic device may recognize a touch input on a display.

An unintended touch input may occur based on how a user grips an electronic device. For example, when a user grips an appropriate size of smart phone with the left hand, a touch input may occur at a left or right edge area of a display due to the user's thumb or remaining fingers other than the thumb. The unintended touch input may be somewhat prevented through a structure of an electronic device (e.g., a structure in which a sidewall of an electronic device is rounded or in which a sidewall and a front surface make an angle of about 90 degrees) or using a bezel area thereof.

Meanwhile, a prototype of a smart phone was presented to the public in the consumer electronics show (CES) held on January, 2013 in Las Vegas. According to the prototype, one (right) sidewall of a display may be expanded for a curved display. Besides, products equipped with curved displays such as the Samsung Galaxy Round and the LG G Flex may be released to the market.

With the advancement of flexible or curved display technologies, it may be possible to provide an electronic device of which the display is expanded toward its sidewall area. In the case where a touch input technique of the related art is applied to such an electronic device without modification, an unintended touch input may frequently occur at the sidewall area if a user grips the electronic device in a general manner.

For example, in the case where a running application supports a multi-touch (e.g., a dual-touch), an electronic device may process a touch input on two different points normally. However, in an electronic device having a display at a sidewall or rear surface, even though a user touches different points of the display for a multi-touch, if an unintended touch input occurs at an area of the sidewall or the rear surface, an electronic device may not normally process inputs of which the number is more than the number of inputs (e.g., two) allowed (or capable of being processed by the electronic device).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for processing touch input.

In accordance with an aspect of the present disclosure, an electronic device is provided. The electronic device includes a display having a first area and a second area functionally divided, a determination module configured to determine a location of a touch input, and a processing module configured to process the touch input based on a state of the electronic device, if the location of the touch input is placed in the second area.

In accordance with another aspect of the present disclosure, a method for processing a touch input at an electronic device which includes a display having a first area and a second area functionally divided is provided. The method includes obtaining a touch input on the display, determining whether a location of the touch input corresponds to the first area or the second area, and processing the touch input based on a state of the electronic device, if the location of the touch input is in the second area.

In accordance with another aspect of the present disclosure, a method for processing a touch input at an electronic device which includes a display having a first area and a second area functionally divided is provided. The method includes determining whether a multi-touch input is input, determining whether a touch input of the multi-touch input occurs in the second area, and processing the touch input of the multi-touch input that occurs in the second area according to a state of a second lock window corresponding to the second area and other touch inputs of the multi-touch input according to a state of a first lock window corresponding to first second area, based on a result of the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
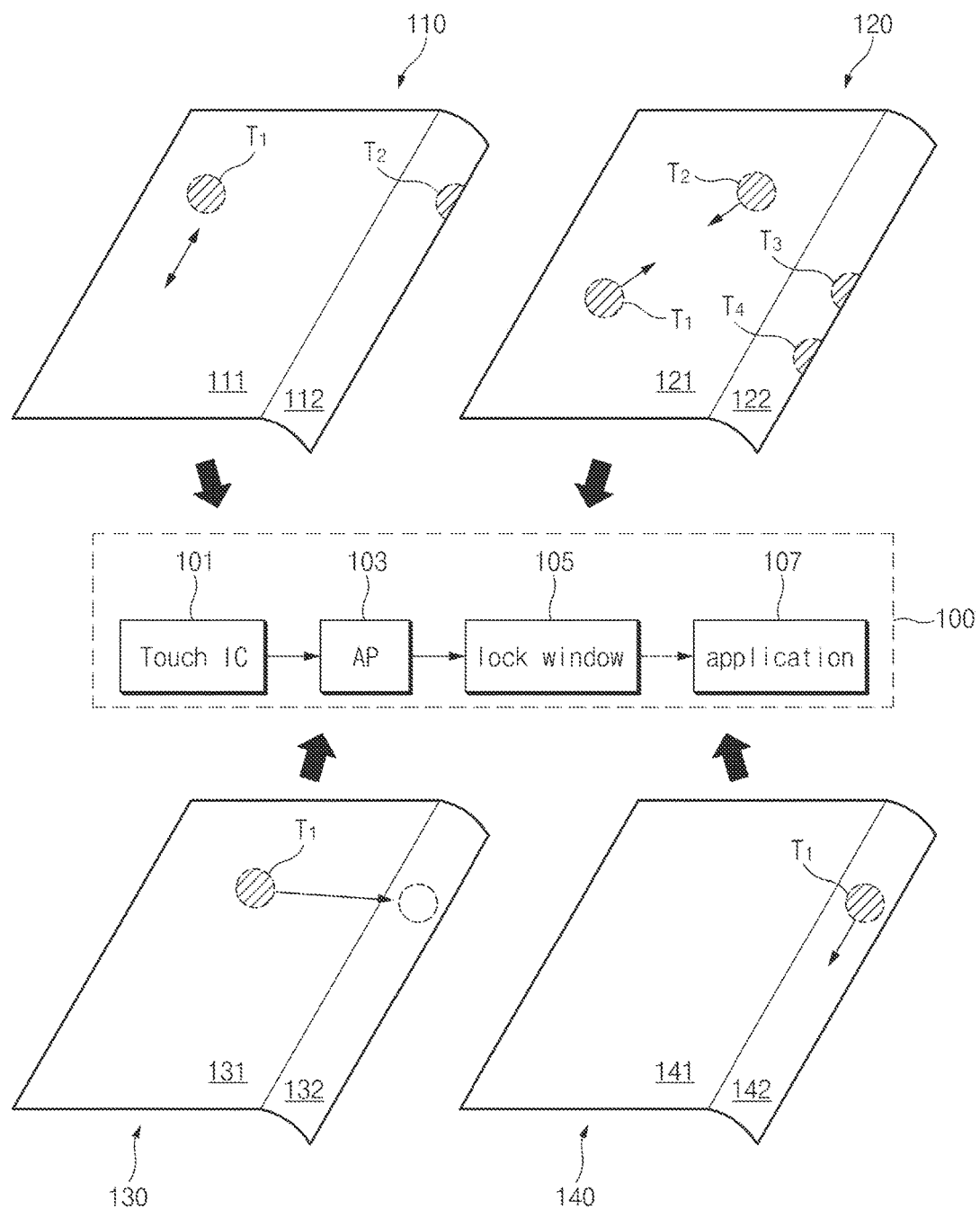
FIG. 1 illustrates a method for processing a touch input occurring at an electronic device according to various embodiments of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. According to various embodiments of the present disclosure, an electronic device may be a flexible electronic device. Also, electronic devices according to various embodiments of the present disclosure are not limited to the above-mentioned devices, and may include new electronic devices according to technology development Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates a method for processing a touch input occurring at an electronic device according to various embodiments of the present disclosure.

Referring to FIG. 1, a display of an electronic device may include at least two or more areas. For the sake of easy description, in FIG. 1, a display (e.g., exemplification 110) may be illustrated as including a flat display area (e.g., an area 111) and a curved display area (e.g., a display area 112) at a right side of the flat display area. Remaining components of the electronic device other than the display may not be illustrated.

According to various embodiments of the present disclosure, the display of the electronic device may be functionally divided into two or more areas. For example, in the exemplification 110, the display area 111 and the display area 112 may be included in a display panel, but functions thereof may be separated. For example, the display area 111 may be an area where general applications (e.g., a message application, a schedule management application, an Internet application, and the like) are executed, and the display area 112 may be an area where icons of applications to be used frequently are displayed.

According to various embodiments of the present disclosure, the display may be divided into areas in various manners. For example, the display may be divided into a main area and an auxiliary area, a flat area and a curved area, a front area and a side area, a front area and a rear area, an area in a viewing angle and an area out of the viewing angle, an area corresponding to a combination of two or more of the above-described areas, or the like. More generally, the display may be divided into a first area and a second area. Below, description will be given under the condition that an area where a general application is executed or a user intentionally performs an input is a first area and an area where an unintended input occurs by a user is a second area. However, the scope and spirit of the present disclosure may not be limited thereto.

In this specification, the term "display" may be understood as including a display supporting touch input functions of various manners such as an add-on type where a touch screen panel (TSP) is coupled with a liquid crystal display (LCD) panel, an on-cell type where a TSP is embedded in an LCD panel, and an in-cell type where a touch function is embedded in an LCD panel.

According to various embodiments of the present disclosure, a touch event input on the display may be processed according to a process 100 illustrated in FIG. 1 in the electronic device. For example, if a touch event is generated, a touch integrated circuit (IC) 101 may determine that the touch event occurred and a location of the touch event. An AP 103 may determine whether the location of the touch event corresponds to any one of functionally divided areas of the display and may provide the touch event to a lock window 105.

If provided with the touch event, the lock window 105 may determine whether to process the touch event by itself or whether to transfer it to an application 107, based on a state of the lock window 105. For example, in the case where the lock window 105 is in an active or enable state, the touch event may be processed at the lock window 105 without transferring the touch event to the application 107. Furthermore, in the event that the lock window 105 is in an inactive or disable state, the touch event may be delivered to the application 107.

The exemplification 110 of FIG. 1 illustrates an example in which a user performs a drag operation at the display area 111 through a touch input T1. In this case, an unintended touch input T2 may occur by a user's hand griping an electronic device or by an input tool such as an electric pen or the like. The touch IC 101 may recognize the touch input T1 and the touch input T2 and may provide information on locations of the touch inputs T1 and T2 to the AP 103.

The AP 103 may determine whether each of the touch inputs T1 and T2 corresponds to any area of the display. For example, the touch input T1 may be determined by the AP 103 as corresponding to the area 111, and the touch input T2 may be determined by the AP 103 as corresponding to the display area 112.

The AP 103 may provide the lock window 105 with the touch input T2 corresponding to the display area 112. If the lock window 105 is in the enable state, the touch input T2 may not be transferred to the application 107. Accordingly, a scroll according to the touch input T1 may be normally performed. If the lock window 105 is in the disable state, the touch input T2 may be transferred to the application 107.

An exemplification 120 of FIG. 1 illustrates an example in which a user performs a multi-touch operation (e.g., image reduction) through the touch inputs T1 and T2 on a display area 121. In this case, unintended touch inputs T3 and T4 may occur at the display area 122 by a user's hand griping an electronic device or by an input tool such as an electric pen or the like. In the case where the lock window 105 is in the enable state, the touch inputs T3 and T4 may be processed at the lock window 105, and the intended touch inputs T1 and T2 of the user may be normally processed.

An exemplification 130 of FIG. 1 illustrates an example in which a touch input T1 starting from a display area 131 moves up to a display area 132. According to the related art, in this case, as an icon placed at the display area 132 is selected, an application or a function corresponding to the icon may be executed at the area 131, or an operation environment (e.g., whether to use wireless-fidelity (Wi-Fi)) of the electronic device may be changed. However, according to various embodiments of the present disclosure, in the case where a lock window corresponding to the area display 132 is enabled, an operation of an application (an application running at the display area 131) which a user is utilizing may be maintained even though the touch input T1 moves up to the display area 132.

An exemplification 140 of FIG. 1 illustrates an example in which a touch input T1 moves (e.g., is scrolled) on a display area 142, which is adjacent to display area 141. The display area 142 may be used to adjust screen brightness, a sound level, and the like of an electronic device. According to various embodiments of the present disclosure, after a user changes a state of a lock window corresponding to the display area 142 into a disable state, a state of the lock window may be changed into an enable state manually or automatically if adjustment is completed, thereby making it possible to maintain a specified value (e.g., screen brightness, a sound level, and the like). Various embodiments on a state change of a lock window will be described further below.

An exemplification illustrated in FIG. 1 is to describe a portion of various input patterns capable of being input in an electronic device and may not limit an embodiment of the present disclosure.

Elements constituting an operation of the present disclosure, implemented with hardware and/or software, described in FIG. 1 may be expressed in various manners. For example, the touch IC 101 which determines an occurrence of a touch input and a location of a touch input may be expressed as a determination module on an input position. Also, the AP 103 may be expressed like a processor, a control module, a processing module, or the like. The lock window 105 may be expressed as a lock layer, a lock window frame, or a module (e.g., touch input management module) for managing a touch input on an object displayed on a display area or a display. The touch input may include a proximity touch input (e.g., hovering) as well as a direct touch input on the display area. The lock window may include a graphical user interface (GUI) or may not include the GUI. In the case of including the GUI, the lock window may further include a GUI for changing a state of the lock window. The application 107 may mean a currently running application or an application to be executed by a touch input. According to various embodiments of the present disclosure, the lock window 105 and the application 107 may operate on an application layer, and the lock window may operate as a service or function that an operating system (OS) provides.

Figure 2:
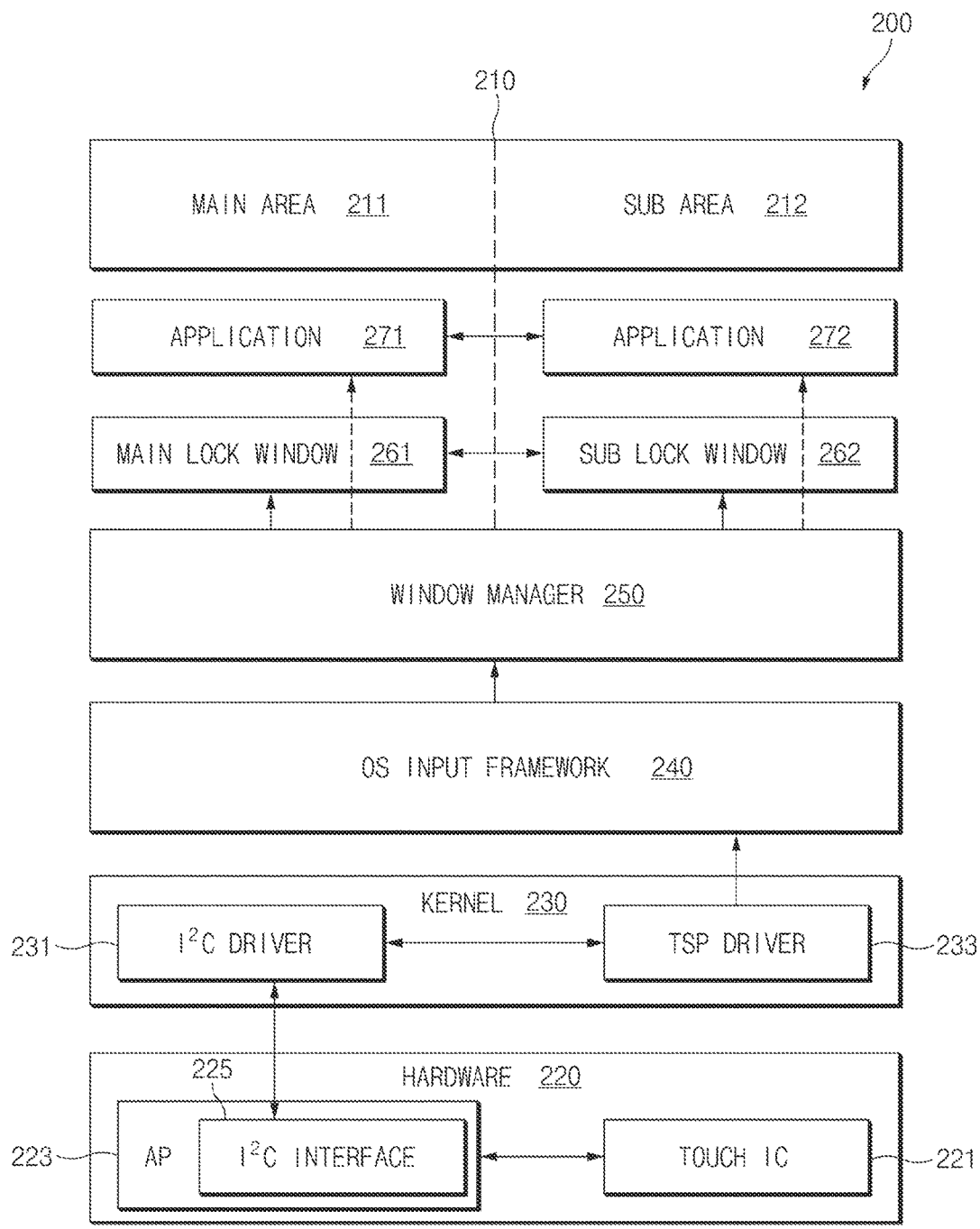
FIG. 2 illustrates an electronic device processing a touch input using a lock window according to various embodiments of the present disclosure.

FIG. 2 illustrates an electronic device processing a touch input using a lock window according to various embodiments of the present disclosure.

Referring to FIG. 2, an electronic device 200 may include a display 210 to support a touch function and hardware 220 for processing a touch input. Also, the electronic device 200 may include various layers for processing a touch input on a kernel 230. For example, an OS input framework 240, a window manager 250, a main/sub lock window 261/262, applications 271 and 272, and the like may be included in the electronic device 200. A more general exemplification will be described further below with reference to FIG. 11.

According to various embodiments of the present disclosure, a display 210 may be divided into a main area 211 and a sub area 212. The display 210 may include a first area and a second area functionally partitioned. For example, the display 210 may include a first area having a flat surface and a second area functionally separated (physically connected with) from the first area and having a curved surface extending from the first area.

According to various embodiments of the present disclosure, a touch IC 221 may recognize a touch event generated at the display 210 and may determine a point (or coordinates) where the touch event is generated. The touch IC 221 may determine a location of a touch event based on a capacitance variation of a touch panel and the like. In general, the touch IC 221 may be understood as a type of determination module, and the determination module may determine a location of a touch event generated at a touch panel which uses a resistive manner or an optical manner (e.g., an infrared manner, an ultrasonic manner, and the like) as well as a capacitive manner. Also, the determination module may determine a location of a touch event in response to an input (e.g., a gesture, local area communication data, long distance communication data, a voice signal, and the like), provided through a module illustrated in FIG. 12 and from which display coordinates are determined.

According to various embodiments of the present disclosure, the touch IC 221 may transfer the touch event (signal) to the kernel 230 from an AP 223 in a manner such as interrupt. According to various embodiments of the present disclosure, the AP 223 may be understood as being a type of processing module. The AP 223 may control and process various operations of the electronic device 200. The AP 223 may include an I$^2$C interface 225. In the case where the AP 223 is provided in the form of system on chip (SoC), it may perform a communication function (e.g., a function of a communication processor (CP)) and/or graphics processing (e.g., a function of a graphics processing unit (GPU)) as well as a calculation function. Various functions which the AP 223 performs will be described further below with reference to FIG. 12.

According to various embodiments of the present disclosure, the AP 223 may determine whether the location of the touch event corresponds to the main area 211 or to the sub area 212, based on a point (coordinates) where the touch event is generated. Based on the determination, the AP 223 may allow the window manager 250 to transfer the touch input to a sub lock window 262 (or a main lock window 261 or an application 271).

According to various embodiments of the present disclosure, a touch event received through an I$^2$C driver 231 may be transferred to the OS input framework 240 (e.g., an Android input framework) through a TSP driver 233, and the OS input framework 240 may provide the window manager 250 with the touch event thus transferred. The window manager 250 may be included in a middleware (e.g., a middleware 1330 of FIG. 13) or an application framework layer of an Android-based OS.

Based on a determination result of the AP 223, the window manager 250 may transfer the touch event to the main lock window 261 or the sub lock window 262. For example, if the touch event is determined as occurring at the sub area 212, the window manager 250 may transfer the touch event to the sub lock window 262.

The window manager 250 may lock the entirety of the sub area 212 of the electronic device 200. Alternatively, in the case where a user provides an input at the sub area 212, first, a lock window may be set according to a detected input so as to lock a portion of the sub area 212. In this case, a lock window set to the sub area 212 may be a shape where the sub area 212 is divided at a constant ratio, a closed curve fit to a shape of an area where a touch event is generated, or a shape of a figure with an appropriate size including the same.

In the case where the sub lock window 262 is in an enable state, a touch event may not be transferred to the application 272. In the case where the sub lock window 262 is in a disable state, a touch event may be transferred to the application 272. For example, a touch event generated at the sub area 212 in the event where the sub lock window 262 is in an enable state may not be transferred to the application 272, and a touch event generated at the main area 211 (e.g., in the case where the main lock window 261 does not exist or is in a disable state) may be transferred to the application 271. Accordingly, an intended touch input of a user may operate normally.

According to various embodiments of the present disclosure, the application 271 may be executed at the main area 211, and the application 272 may be executed at the sub area 212. Furthermore, the application 271 and the application 272 may be different from each other, or may be applications executed at corresponding areas and supporting different shapes or functions. For example, in case of a video replay application, a video screen may be replayed (corresponding to an application 271) at the main area 211, and a control menu (list, previous, next, suspension, replay, mute, and the like) for controlling a replay/volume may be output (corresponding to the application 272) at the sub area 212. In this case, if the sub lock window 262 of the sub area 212 is set to an enable state, it may be possible to prevent sudden suspension or volume-max (up) occurring according to a method where a user grips an electronic device 200.

Figure 3:
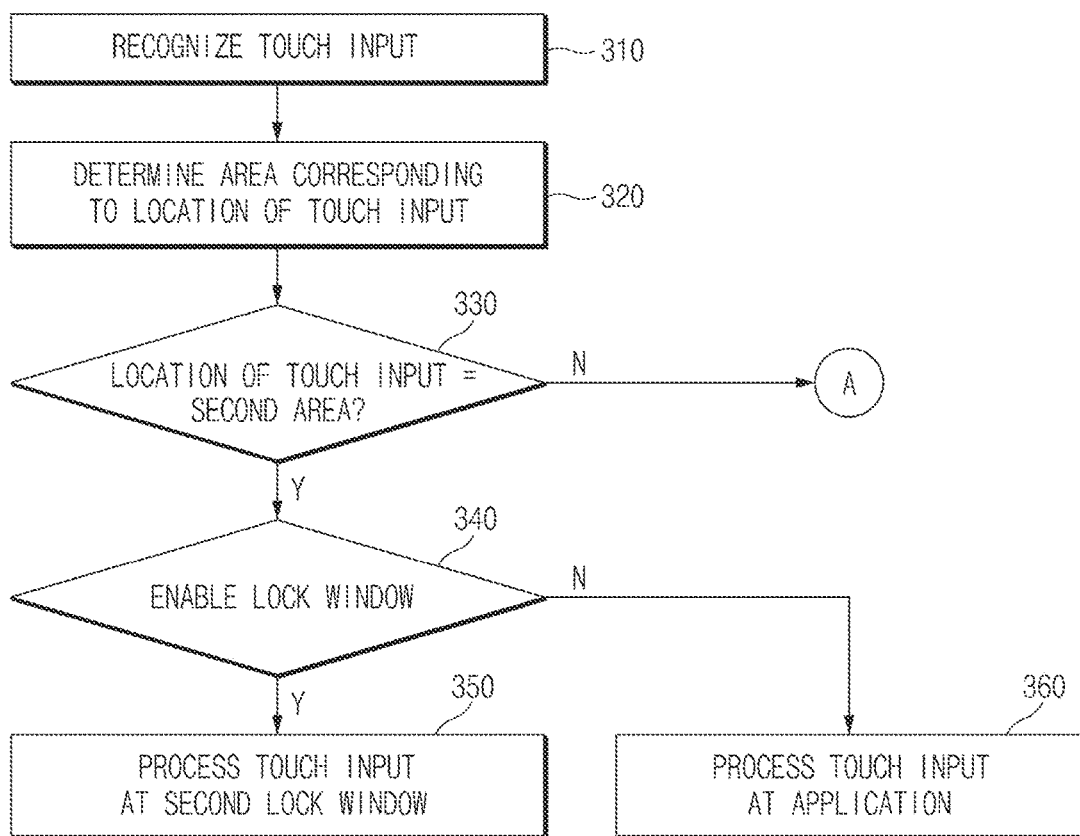
FIG. 3 illustrates a touch input processing method according to various embodiments of the present disclosure.
Figure 5:
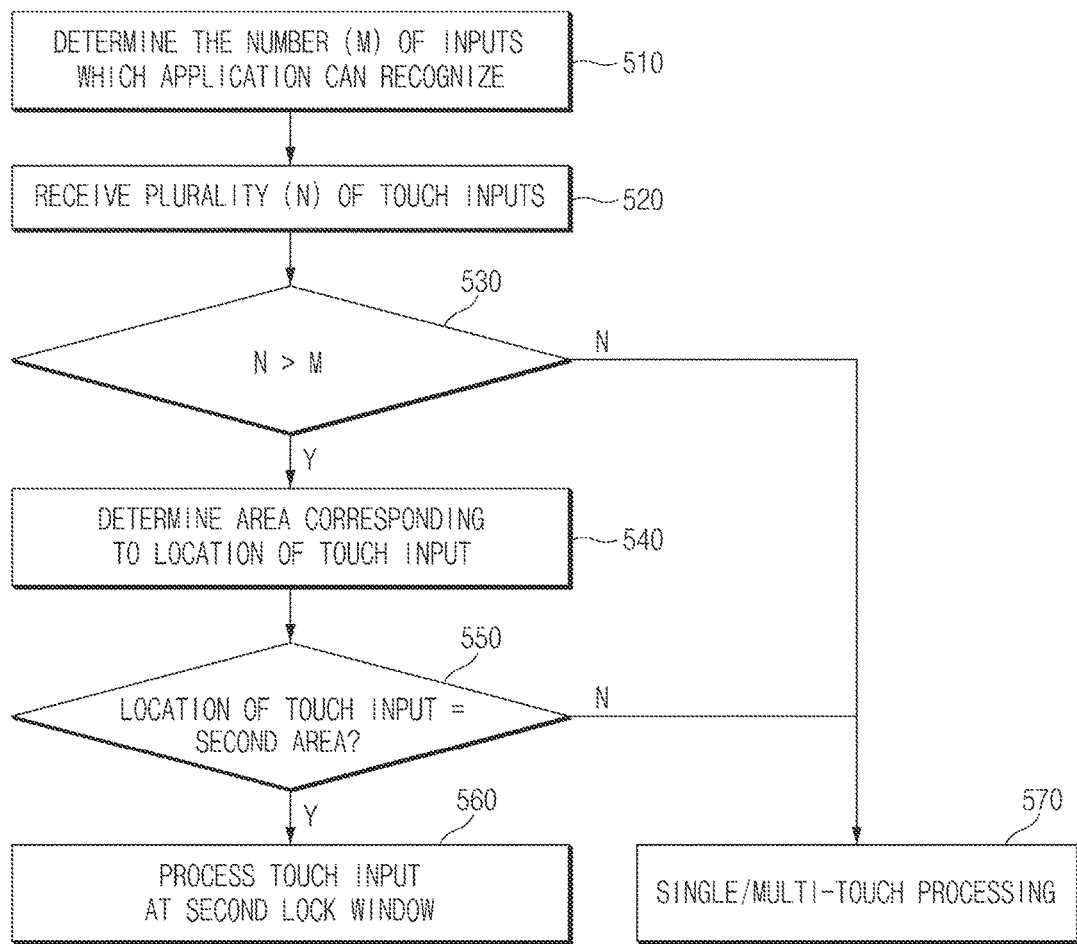
FIG. 5 illustrates a touch input processing method according to the number of touch inputs according to various embodiments of the present disclosure.
Figure 6:
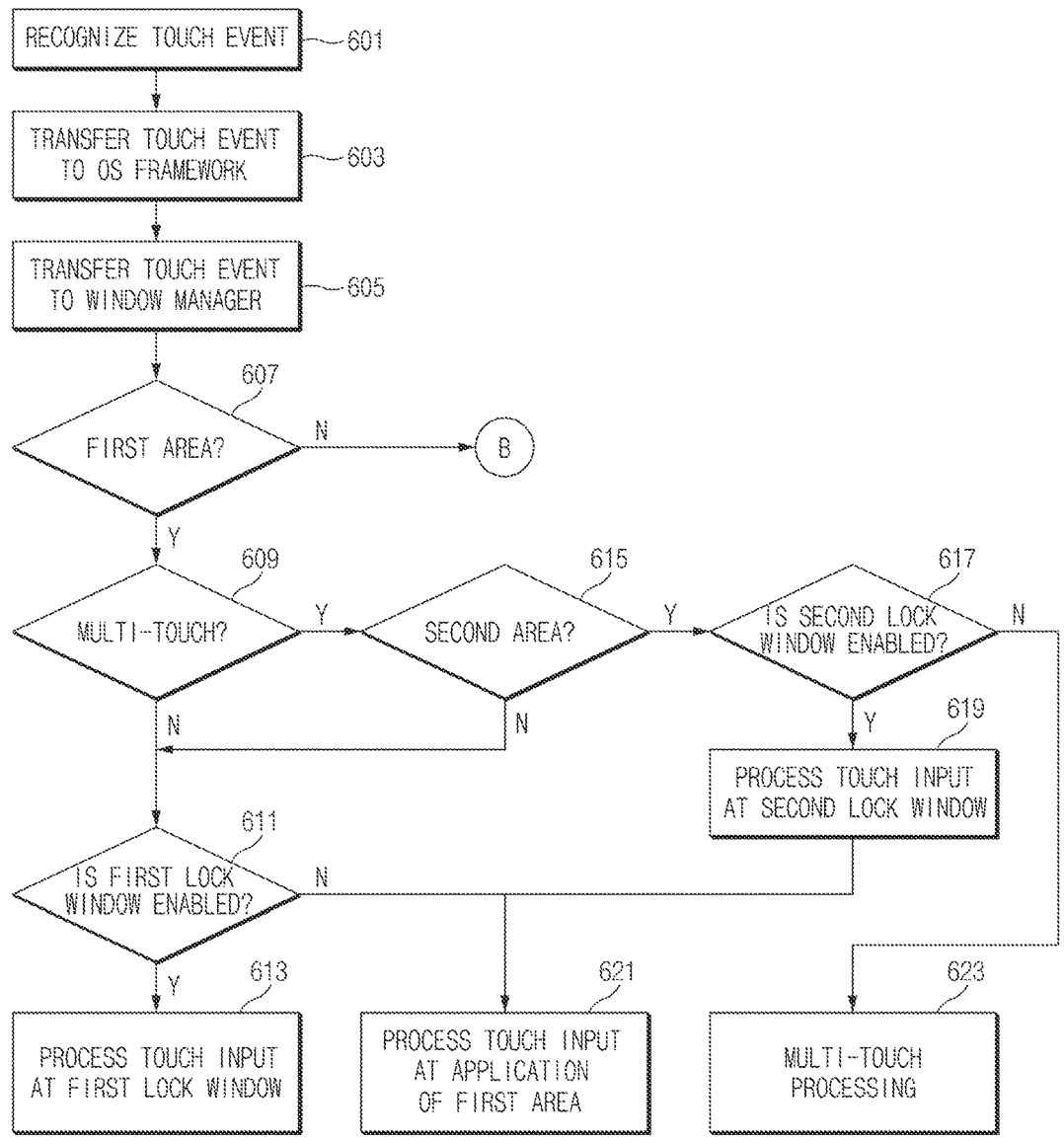
FIG. 6 illustrates a multi-touch processing method according to various embodiments of the present disclosure.

FIGS. 3, 5, and 6 illustrate a touch input processing method according to various embodiments of the present disclosure. Referring to FIG. 3, a method may be illustrated to process one touch event.

FIG. 3 illustrates a touch input processing method according to various embodiments of the present disclosure.

Referring to FIG. 3, in operation 310, an electronic device (e.g., an electronic device 200) may recognize a touch input. For example, in the case where a touch input using a user's hand, a stylus, or the like occurs on a touch panel or a display including a touch function, a determination module (e.g., a touch IC) may recognize that a touch event according to a touch input is generated. Furthermore, the determination module may recognize a point (e.g., coordinates) where the touch input occurs, together with determination of occurrence of the touch event. The touch input may be a proximity touch input or another type of input from which display coordinates are determined.

In operation 320, the electronic device may determine whether the location of the touch input corresponds to any area of a display. For example, a processor (e.g., a processing module) of the electronic device may determine an area, corresponding to the location of the touch input, from among a plurality of areas functionally divided. Below, for the sake of easy description, the present disclosure will be described under the condition that a display of the electronic device is divided into a first area and a second area and the first area is a main display area of the electronic device.

If the location of the touch input is determined, in operation 330, as corresponding to the second area, the electronic device may perform a process after operation 340. If the location of the touch input is determined as not corresponding to the second area (e.g., as corresponding to the first area), the electronic device may perform process A. The process A may be an operation for transferring the touch input to an application running (being displayed) at the first area.

In operation 340, the electronic device may determine whether a lock window of the second area is in an enable state. If the lock window is in the enable state, the electronic device may perform operation 350; if the lock window is not at the enable state (is in a disable state), the electronic device may perform operation 360.

In operation 350, that is, in the case where a state of a lock window corresponding to the second area is an enable state, the electronic device may allow the touch input to be processed at the lock window. For example, in the case where the lock window is in an enable state, the processing module may permit the transferred touch input to be ignored without a transfer to an application (e.g., an application running/being displayed at the second area). As another example, the processing module may make it possible to generate a vibration effect, display a text (e.g., a touch input on this area is restricted) at the second area, or change hue or image, in response to the touch input transferred to the lock window. According to various embodiments of the present disclosure, a user may use a touch function without knowing that an unintended input occurs (also, that an unintended input is appropriately ignored), or may adjust a manner of gripping an electronic device based on notification/effect indicating the fact that an unintended input is occurring. As still another example there may be provided the following method: an area of a lock window is minimized by setting a window locking a portion of a sub area, an event generated at the minimized lock window is invalidated, and an input gesture of a user is defined using an input received at the remaining sub area. This method will be described further below in detail with reference to FIGS. 7 and 8.

In operation 360, that is, in the case where a state of a lock window corresponding to the second area is a disable state, the electronic device may transmit the touch input to an application (an application running/being displayed at the second area). For example, in the case where the lock window is in a display state, the processing module may transmit the touch input to an application to perform an operation such as selection of an icon, change of a device setting, entering to another menu, or the like. For example, the processing module of the electronic device may make it possible to perform the following operation: selecting an application so as to be executed at the first area, changing a communication setting (on/off of Wi-Fi, Cellular, Bluetooth (BT), or the like) by selecting an icon/toggle menu of the second area, displaying the whole of application lists, and the like.

According to various embodiments of the present disclosure, a state of a lock window (e.g., a sub lock window 262) corresponding to the second area may be changed according to a situation. Below, how a state of a lock window is changed will be described in detail with reference to FIG. 4.

Figure 4:
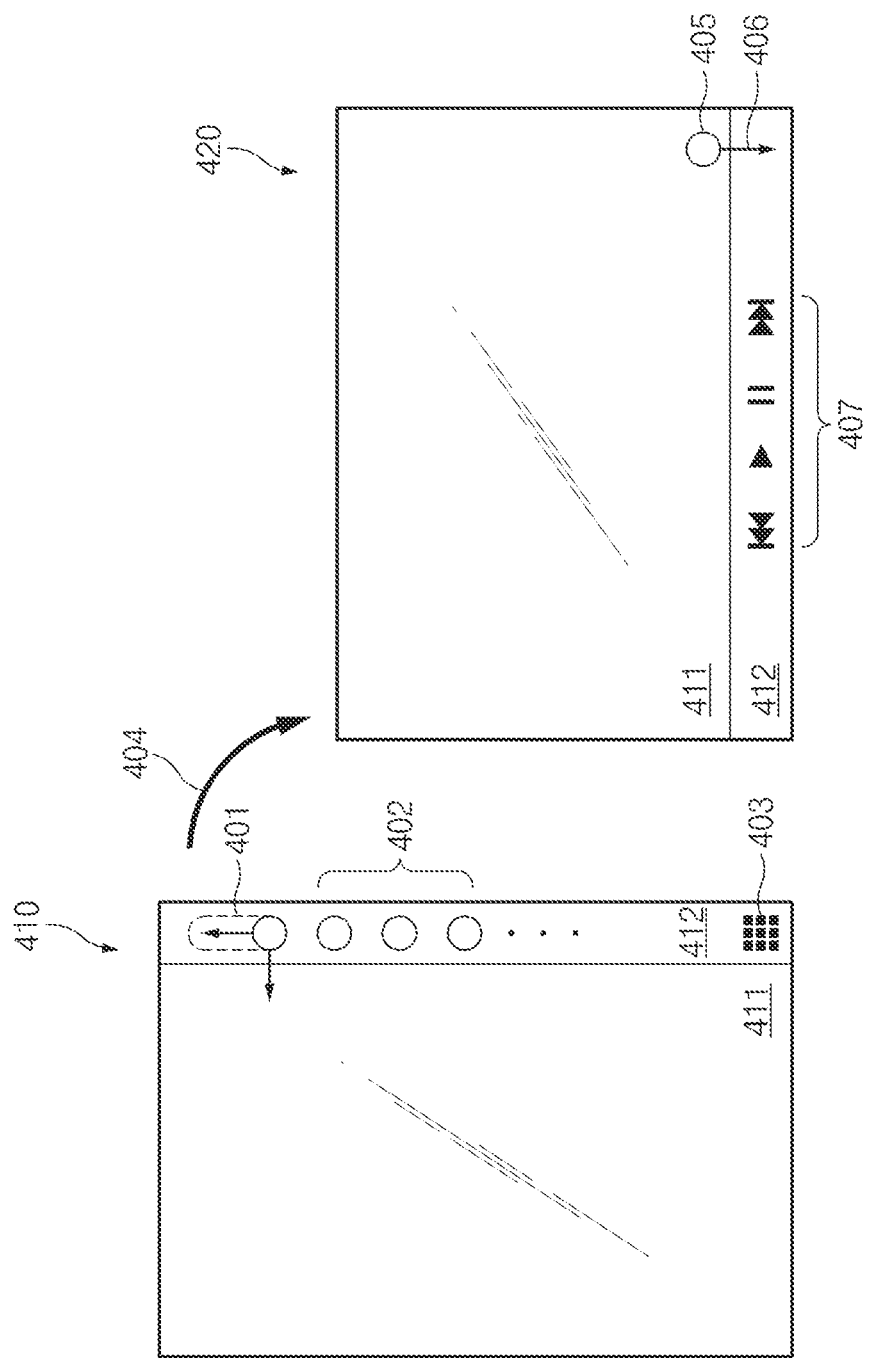
FIG. 4 illustrates a state change of a lock window according to various embodiments of the present disclosure.

FIG. 4 illustrates a state change of a lock window according to various embodiments of the present disclosure.

Referring to FIG. 4, a display of an electronic device may include a first area 411 and a second area 412. For example, internet, video, and picture applications may be executed and displayed at the first area 411. An object (e.g., a button 401) for changing a setting of an electronic device, application icons (e.g., buttons 402), other menus (e.g., a menu 403), and playback controls 407 may be displayed at the second area 412. Below, for convenience sake, a description will be given under the condition that a lock window corresponding to the first area 411 is a first lock window and a lock window corresponding to the second area 412 is a second lock window.

According to various embodiments of the present disclosure, a state of a lock window may be relatively decided according to lock window states of the first area 411 and the second area 412. For example, in the case where a state of the first lock window (e.g., a main lock window 261) is enabled, a state of the second lock window (e.g., a sub lock window 262) may be set to a disable state. In such a situation, for example, in the case where a main display of an electronic device is in a lock state, a touch input of a sub display may be allowed such that screen brightness, sound/vibration/mute setting, whether to use a data network, and the like are changed according to user intention. If a user changes a state of the first lock window into a disable state (e.g., locking of an electronic device or a main display is released), there may be expected that the user intents to provide a touch input at the first area 411. In this case, a processing module may allow the second lock window to be changed into an enable state.

To summarize, the processing module may change a state of the second lock window into a disable state if the first lock window goes to an enable state and into an enable state if the first lock window goes to a disable state.

According to various embodiments of the present disclosure, a state of the second lock window may be changed according to a user input. For example, a state of the second lock window may be changed according to whether a user input is an input for switching an ON/OFF button 401 to an ON state or an OFF state. For example, if a touch input for moving the button 401 from the bottom to the top of a dotted area occurs, the processing module may allow the touch input to be transferred to the second lock window (being at an enable state) through a window manager. If the touch input is received, the second lock window may recognize it as a type of trigger and may change a state of the second lock window from an enable state to a disable state.

The above-described exemplification may be one exemplification on a user input and may be variously modified. For example, the second lock window may go to a disable state by a user input for moving a button 401 toward a first area 411 from a second area 412. Alternatively, the second lock window may go to an enable state by a user input for moving 406 a button 405 toward the second area 412 from the first area 411 (the vice versa being possible).

According to various embodiments of the present disclosure, a state of the second lock window may be changed according to an input of a physical button (or a physical key). For example, if a sleep button (not illustrated) is pushed, a screen corresponding to the first area 411 of the electronic device may be turned off In this case, the electronic device may enter a lock state, or a state of the first lock window may be enabled. Referring to the above-described exemplification, a state of the second lock window may be disabled while a state of the first lock window is enabled. If a user pushes the sleep button once, a state of the second lock window may also become an enable state (i.e., a state where a touch input is never transferred to an application through a display of an electronic device). If the sleep button is again pushed once under the above-described state, a specific screen (e.g., a home screen or a screen for inputting a password/pattern for unlocking) may be displayed.

According to various embodiments of the present disclosure, a state where an electronic device remains at a lock state and a state where a lock window is enabled may be distinguishable. For example, the first lock window may be at a disable state in the case where a user interface (UI) for unlocking is provided at the first area 411 because the electronic device is in a lock state. If a user pushes the sleep button at such a state, a lock state of the electronic device may be maintained without modification and the first lock window may be enabled. At the same time, the second lock window may be disabled, or a user may perform an input through the second area 412, with the lock state of the electronic device maintained.

According to various embodiments of the present disclosure, the electronic device may include various types of sensors (e.g., sensors 1240A to 1240M illustrated in FIG. 12) and may change a state of a lock window using information measured/detected through such sensors. For example, the electronic device may include a gyro sensor, and the processing module of the electronic device may change a state of a lock window based on a slope of the electronic device detected by the gyro sensor. For example, in the case where the electronic device is changed from a portrait mode (a state 410) to a landscape mode (a state 420) through operation 404, the electronic device may operate to watch multimedia or interne contents such as YouTube. In this case, the electronic device may change a state of the second lock window into a disable state. This operation may allow a user to operate a control menu displayed at the second area 412 without affecting contents of the first area 411. As another embodiment, when, at the above-described case, a user changes a state of the second lock window into an enable state to watch contents, the electronic device may prevent an influence on watching contents (e.g., preventing jumping to a next content, mute, and the like). As still another embodiment, user's face or eyes may be identified through a camera to change a lock area or a state of a lock window. As a further embodiment, a lock area or a state of a lock window may be changed through voice information received through a microphone.

FIG. 5 illustrates a touch input processing method according to the number of touch inputs according to various embodiments of the present disclosure. Below, a description duplicated with or corresponding or similar to the above description may be omitted.

Referring to FIG. 5, in operation 510, an electronic device may determine the number (M) of touch inputs that an application currently running at a first area is able to recognize. For example, M=1 if an application is able to recognize one touch input (selection, scroll, and the like). M=2 if an application supports a multi-touch such as magnification/reduction. M=3 or 4 if an application supports a triple touch (a change of a screen resolution) or a four-point touch (an application end or change that an electronic device of a tablet family mainly supports).

According to various embodiments of the present disclosure, even at the same application, a value of M may be changed according to an execution state. For example, in the case where a gallery application outputs an image list, M=1 because only a scroll or selection is possible. However, if a specific image is selected, M=2 because it is possible to magnify/reduce an image.

In operation 520, the electronic device may receive a plurality of, for example, N touch inputs. For example, there may be received a multi-touch (a touch on two points) for image magnification as an intended touch of a user and a sidewall touch as an unintended touch of a user.

In operation 530, the number N of touch inputs occurring may be compared with the number M of touch inputs which an application is able to recognize. If N is greater than M, the electronic device may perform operation 540; otherwise (if N is smaller than or equal to M), the electronic device may perform operation 570.

In the case where N is greater than M, that is, in the case where the number of touch inputs recognized is more than the number of touches which an application is able to recognize, the probability that an unintended touch input of a user occurs may be high. Accordingly, operations 540 to 560 may be performed to remove an unintended input, for example, a user input occurring at a second area where a first application is not executed/displayed. Below, a description will be given under the assumption that a lock window (e.g., a second lock window) corresponding to the second area is in an enable state.

Operations 540 and 550 may correspond to operations 320 and 330 of FIG. 3. For example, in operation 540, the electronic device may determine whether a location of each of a plurality of touch inputs corresponds to the second area. In operation 550, if the determination result indicates that a location of a touch input corresponds to the second area, a processing module of the electronic device may perform operation 560; otherwise, the processing module of the electronic device may perform operation 570.

If the location of the touch input corresponds to the second area, in operation 560, the electronic device may ignore the touch input, thereby making it possible to perform an operation (e.g., a control of an application or the like) corresponding to a touch input, intentionally provided at a first area, from among N touch inputs occurring. Alternatively, in operation 560, the electronic device may transfer an input occurring at the second area to an additional windowing module for an additional analysis and may set a lock window blocking only a portion of the second area to process an input occurring at the second area.

In the case where the determination result indicates that a location of a touch input does not correspond to the second area, the processing module may process the touch input as a general multi-touch input even though the number of touch inputs occurring is more than the number of applications (e.g., a portion M of N inputs is randomly processed or a touch input is never processed). Furthermore, in operation 570, the processing module may process a single touch input (if, in operation 530, N is smaller than M and N=1).

FIG. 6 illustrates a multi-touch processing method according to various embodiments of the present disclosure. Below, a description duplicated with or corresponding or similar to the above description will be omitted.

Referring to FIG. 6, in operation 601, a determination module (e.g., a touch IC 221) of an electronic device may recognize a touch event generated by a touch input on a specific point (coordinates). In operation 603, a processing module (e.g., an AP 223) of the electronic device may allow the touch event to be transferred to an OS framework (e.g., an OS input framework 240). Furthermore, in operation 605, the touch event may be transferred to a window manager (e.g., a window manager 250).

In operation 607, the window manager may determine whether the touch event is generated at a first area of a display. If the touch event is determined as being generated at not the first area but an area, for example, a second area, operation B may be performed. Operation B may correspond to a process after operation 340 illustrated in FIG. 3.

If the touch event is determined in operation 607 as being generated at the first area, in operation 609, a processing module may determine whether the touch event corresponds to a multi-touch. For example, the processing module may determine whether another touch input constituting a multi-touch together with the touch event exists. In the case where the determination result indicates that another touch input constituting a multi-touch together with the touch event exists, in operation 615, the processing module may determine whether a touch input, occurring at the second area, from among touch inputs exists.

In the case where a touch input occurring at the second area exists, in operation 617, the processing module may perform operation 619 or 623, based on a state of a second lock window corresponding to the second area. In detail, in the case where a state of the second lock window is an enable state, the touch input occurring at the second area may be processed at the second lock window. In this case, remaining touch inputs of inputs, constituting a multi-touch, other than the touch input occurring at the second area may be provided to an application of the first area for processing. Furthermore, in operation 619, the electronic device may transfer an input occurring at the second area to an additional windowing module. The windowing module may analyze the transferred input to set a lock window blocking only a portion of the second area and may process an input of the second area based on the lock window. This will be described further below in detail later.

If the second lock window is determined in operation 617 as being at a disable state, an input may be processed as a general multi-touch input. Since, in an embodiment of FIG. 6, a process is performed based on whether a touch input occurs at the first area (refer to operation 607), in the case where a multi-touch input occurs over the first area and the second area and lock windows on both areas are at a disable state, the multi-touch may be first applied to an application displayed at the first area. For example, in the case where a two-point touch input (inputs A and B) for image magnification is maintained at the first area and one touch input (an input B) then moves to a position of the second area, even though an icon is displayed at a point corresponding to the input (an input B), the input may be first applied to an image magnifying operation being executed at the first area, not an icon selecting operation.

Returning to operation 609, if a touch input occurring at the first area does not constitute a multi-touch together with another input (e.g., a single touch), the processing module may process the touch input based on a state of a first lock window. For example, in the case where the first lock window is determined in operation 611 as being at an enable state, in operation 613, the processing module may allow the touch input to be processed at the first lock window. This operation may correspond to an exemplification described with reference to operation 350. In the case where the first lock window is determined in operation 611 as not being at an enable state (e.g., in the case where the first lock window is in a disable state or does not exist), in operation 621, the processing module may transfer the touch event to a first application.

Figure 7:
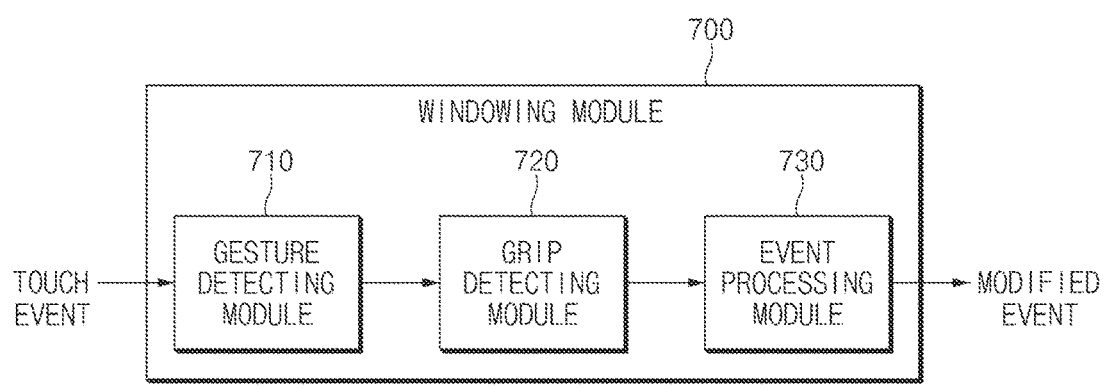
FIG. 7 illustrates a configuration of a windowing module implemented additionally implemented to search for an optimal size in the case where a size of a lock window covers a portion, not the whole, of a display are of an electronic device according to various embodiments of the present disclosure.

FIG. 7 illustrates a configuration on a windowing module 700 implemented to set a lock window on a portion, not the whole, of a second area (e.g., a sub area) during an operation, in which a touch input is processed at a second lock window, performed in operation 350 of FIG. 3, operation 560 of FIG. 5, and operation 619 of FIG. 6 according to various embodiments of the present disclosure.

Referring to FIG. 7, a windowing module 700 may include a gesture detecting module (or a gesture detector) 710 defining and detecting an event being able to being generated at a sub area unlocked by a lock window and a grip detecting module (or a grip detector) 720 determining a grip gesture of a user. Also, the windowing module 700 may be implemented to include or not to include an event handling module (or an event handler) 730 based on a situation of a hardware or software module. According to various embodiments of the present disclosure, the windowing module 700 may be implemented to be included in a window manager 250 or may implemented independently so as to operate in connection with the window manager 250.

In an electronic device, the windowing module 700 may analyze a touch event to determine whether to transfer the touch event. Furthermore, the electronic device may generate or transfer a new event previously defined using the windowing module 700. At this time, the gesture detecting module 710 and the grip detecting module 720 of the windowing module 700 may operate sequentially (e.g., after the gesture detecting module 710 operates, the grip detecting module 720 operates, or the vice versa) or may operate in parallel (e.g., the gesture detecting module 710 and the grip detecting module 720 operate independently of each other).

Figure 8:
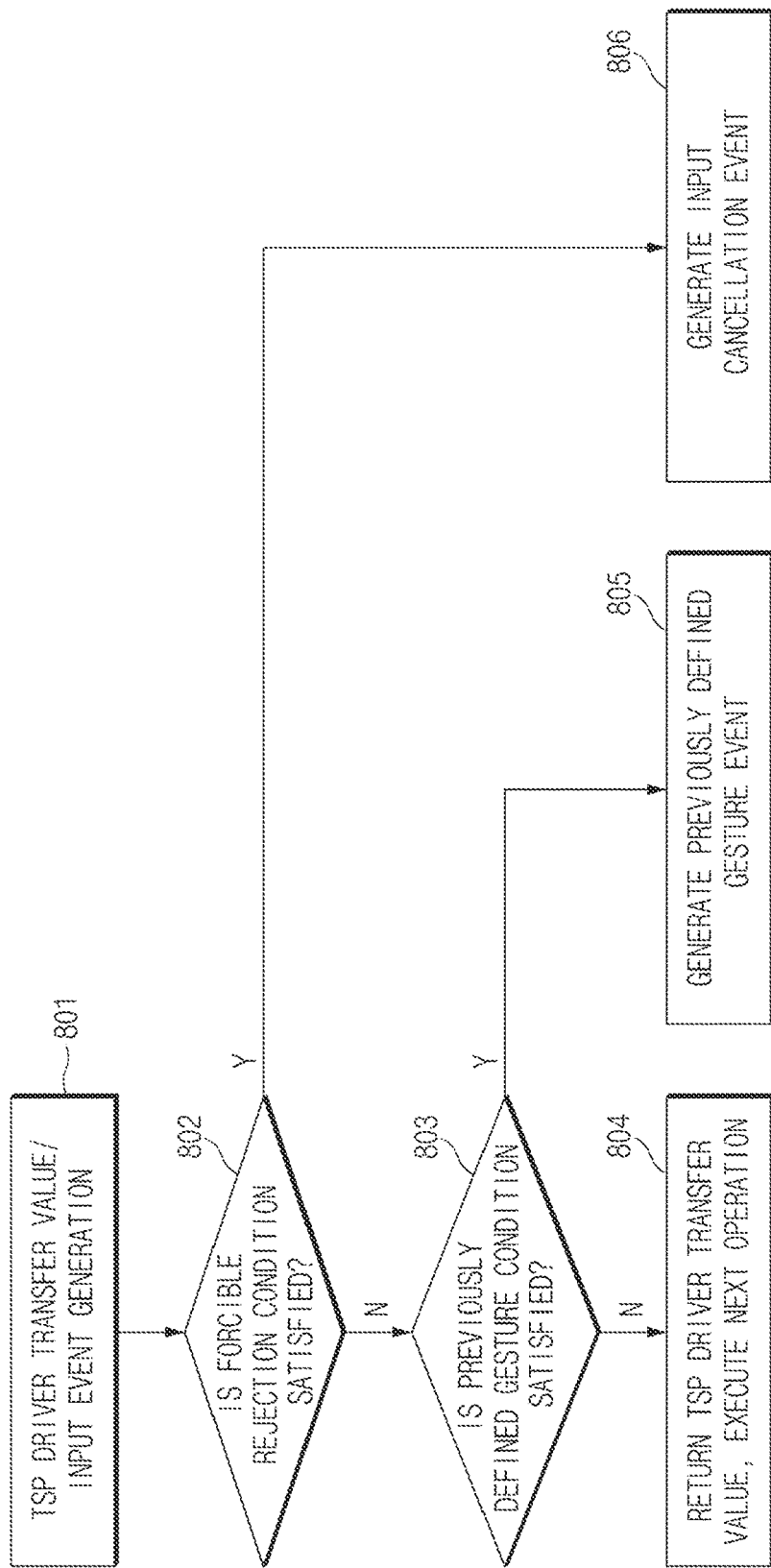
FIG. 8 illustrates a fundamental operation of a gesture detector as a component of a windowing module according to various embodiments of the present disclosure.

FIG. 8 illustrates a fundamental operation method of a gesture detecting module 710 according to various embodiments of the present disclosure.

Referring to FIG. 8, in operation 801, an event generated by a touch input may be transferred to a gesture detecting module 710 from any other hardware or software module of an electronic device.

In operation 802, inputs corresponding to unintended gestures of a user may be filtered. The filtered inputs may be forcibly canceled or ignored, thereby reducing the amount of calculation required to determine whether or not of a previously defined gesture or the number of times that whether or not of a previously defined gesture is checked.

An input pattern of an unintended gesture (or an input thereof) of a user may be previously stored or defined at an electronic device. For example, there may be stored or defined an input on a specific position in a sensor or a dead zone intentionally set by an electronic device manufacturer, an operation where a contact is maintained over a specific time, a single input of which the detected area is greater than or equal to a specific area, an input received after detectable inputs of a touch detecting sensor (e.g., a gesture sensor 1240A) all are provided, the earliest occurring input in the case where an input is newly received after detectable inputs of a touch detecting sensor, or a combination thereof. The above-described conditions/rules may be updated, changed, added, or deleted by an electronic device manufacturer or a user of an electronic device.

In operation 802, an input which is not filtered may be transferred to operation 803. In operation 803, for a user to utilize a sub area, the electronic device (e.g., a gesture detecting module 710) may check a condition on a previously defined gesture to determine whether an input is a transferred input. At this time, a possible gesture may be defined by an electronic device manufacturer or a user. That is, there may be defined operations performed at the sub area such as scrolling, dragging, revolving, expanding, magnifying, reducing, and the like and input conditions for respectively performing the operations. The input conditions may be defined in combination with physical quantities, provided from all usable hardware or software components of an electronic device, such as duration of a specific input, a degree of force of a specific input, a contact area, a length or angle of a route formed by an input on time series or a pattern thereof, a condition transferred from any other sensor, and the like.

If the transferred input corresponds to a previously defined event, in operation 805, the electronic device may generate a new gesture event to transfer it to any other module (e.g., any other hardware module, software module, or application software). In some embodiments of the present disclosure, the electronic device may transfer both the event and the transferred input if needed.

If the transferred input is determined in operation 803 as not being a previously defined event, the electronic device may postpone determination, and, in operation 804, may transfer the transferred input to any other hardware or software module.

According to various embodiments of the present disclosure, in the case where the transferred input is determined in operation 802 as being an input not viewed as an intended gesture, in operation 806, the electronic device may generate an event for cancelling or ignoring the transferred input and may transfer the event to any other hardware or software module.

Figure 9:
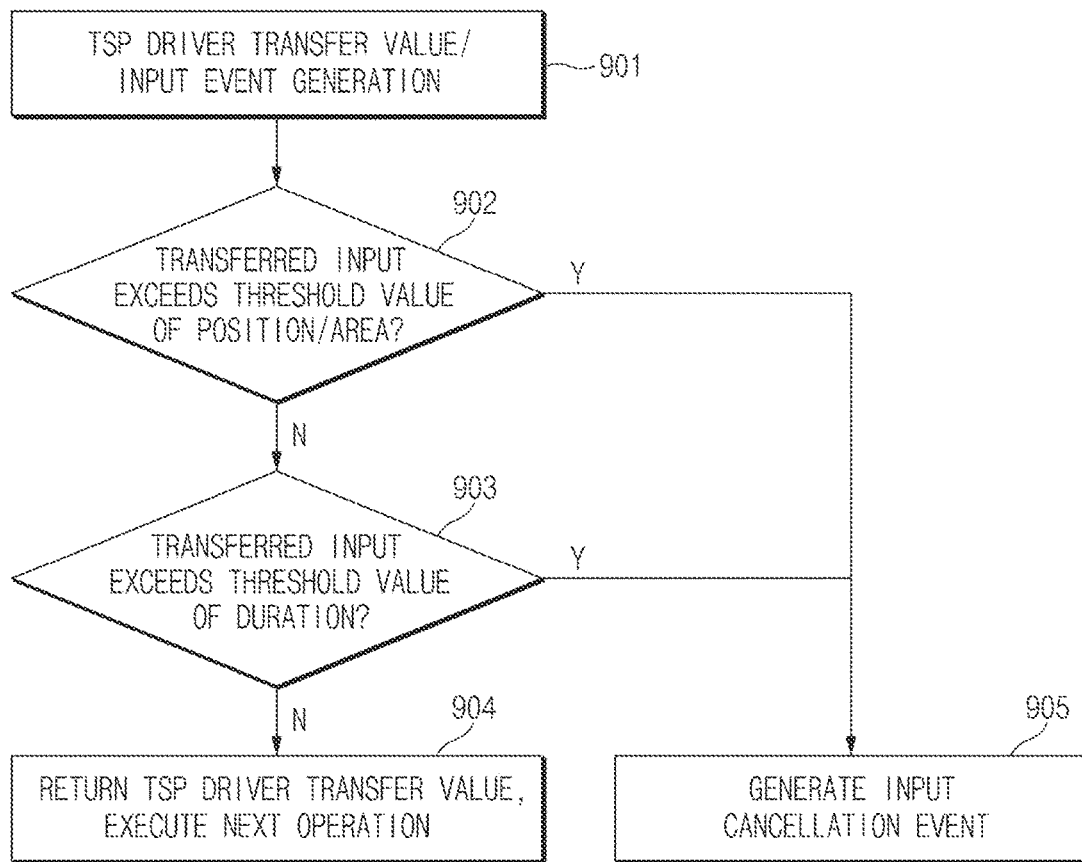
FIG. 9 illustrates a fundamental operation of a grip detector as a component of a windowing module according to various embodiments of the present disclosure.

FIG. 9 illustrates a fundamental operation method of a grip detecting module 720 according to various embodiments of the present disclosure.

Referring to FIG. 9, operation 901 may illustrate that an operation initiates as an event generated by a touch input is transferred from any other hardware or software module of an electronic device to a grip detecting module 720.

In operation 902, to determine that a transferred input occurs by a grip of a user, the electronic device (e.g., a grip detecting module 720) may determine whether the transferred input exceeds a threshold value of corresponding physical quantities, using instantly identifiable physical quantities such as a position, an area, and a shape of an input occurring, the number of inputs occurring, and the like. Because an identifiable physical quantity of the transferred input exceeds the threshold value, the transferred input may be determined as occurring due to a grip or mistaken input of a user. In this case, in operation 905, the grip detecting module 720 may generate an event for requesting cancellation or disregard on the transferred input.

To determine that the transferred input occurs by a grip of a user, in operation 903, the grip detecting module 720 may determine whether or not of a grip or mistaken input of a user using physical quantities needing time sequential analysis such as input duration, a distance of a moving route, an angle, a speed, and the like. Because the physical quantities needing time sequential analysis such as input duration, a distance of a moving route, an angle, a speed, and the like exceed a threshold value, the transferred input may be determined as occurring due to a grip or mistaken input of a user. In this case, in operation 905, the grip detecting module 720 may generate an event for requesting cancellation or disregard on the transferred input.

If it is impossible to determine an input even though operations 902 and 903 are performed, the probability that an input is an intended input of a user may be high. For this reason, in operation 904, the electronic device may transfer the transferred input to any other hardware or software module.

Figure 10A:
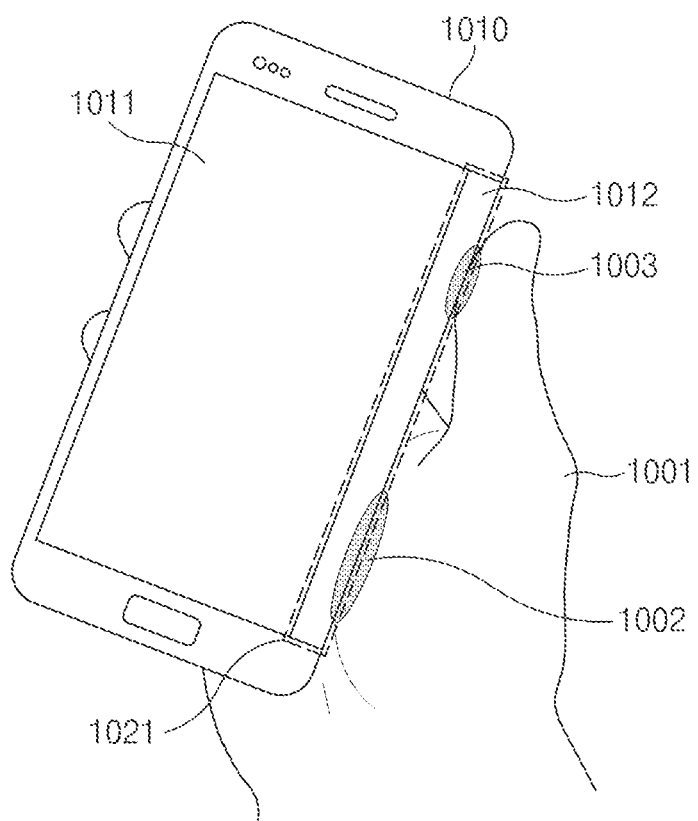
FIGS. 10A and 10B illustrate an advantage obtained in the case where a lock window is restricted to a grip area using a windowing module according to various embodiments of the present disclosure.
Figure 10B:
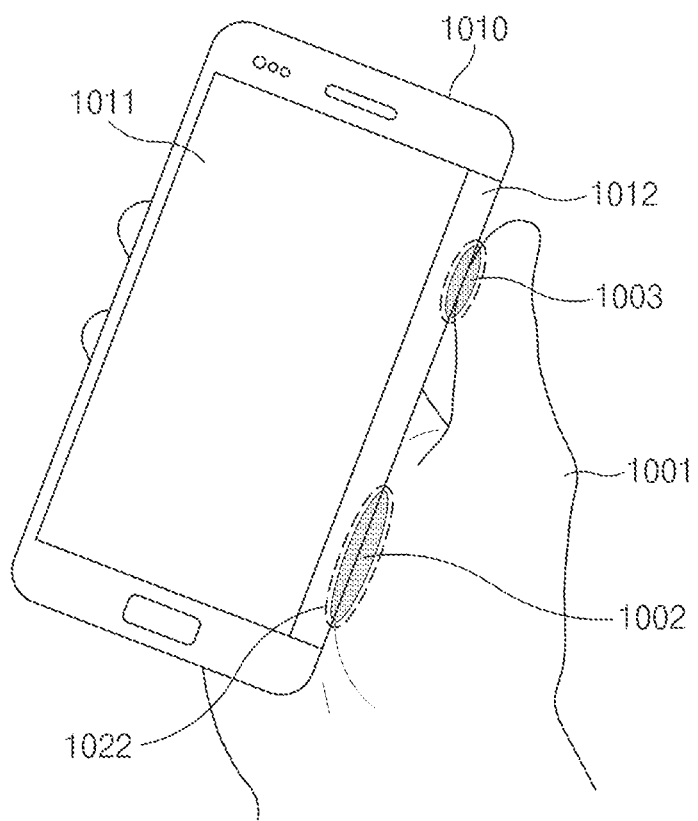

FIGS. 10A and 10B illustrate exemplifications of a lock window set to a sub area according to various embodiments of the present disclosure.

Referring to FIGS. 10A and 10B, the case where an input is performed, with an electronic device 1010 gripped by a hand 1001 of a user. The electronic device 1010 may include a main area 1011 and a sub area 1012. Furthermore, the electronic device 1010 may set the whole or a portion of the sub area 1012 as a lock window 1021. An (unintended) input due to a grip and an intended input 1003 for performing a specific function at the sub area 1012 may occur by the hand 1001 of the user.

FIG. 10A may illustrate an exemplification in which, as a lock window, the whole of the sub area is enabled or disabled without performing an operation described with reference to FIGS. 7 to 9. Furthermore, FIG. 10B may illustrate the case in which, as a lock window, a portion of the sub area is set through an operation described with reference to FIGS. 7 to 9. At this time, a shape of the lock window may not be limited to a quadrangle.

Referring to FIG. 10A, in the case where an unintended input 1002 of a user occurs, the lock window 1021 may be applied to the whole of the sub area 1012, thereby making it possible to process an intended input 1003 of a user at the lock window 1021. In this case, if an unintended input is once detected, a user may not use the whole of the sub area 1012 until any other input for changing a state of a lock window occurs.

Referring to FIG. 10B, in the case where an unintended input 1002 of a user occurs, the lock window 1022 may be applied to a portion of the sub area 1012. In this case, an intended input 1003 of a user may be recognized which occurs at an area not corresponding to the lock window 1022 and included in the sub area 1012, thereby making it possible to provide more conveniences and various functions to a user through a UI using the intended input 1003 of a user.

Figure 11:
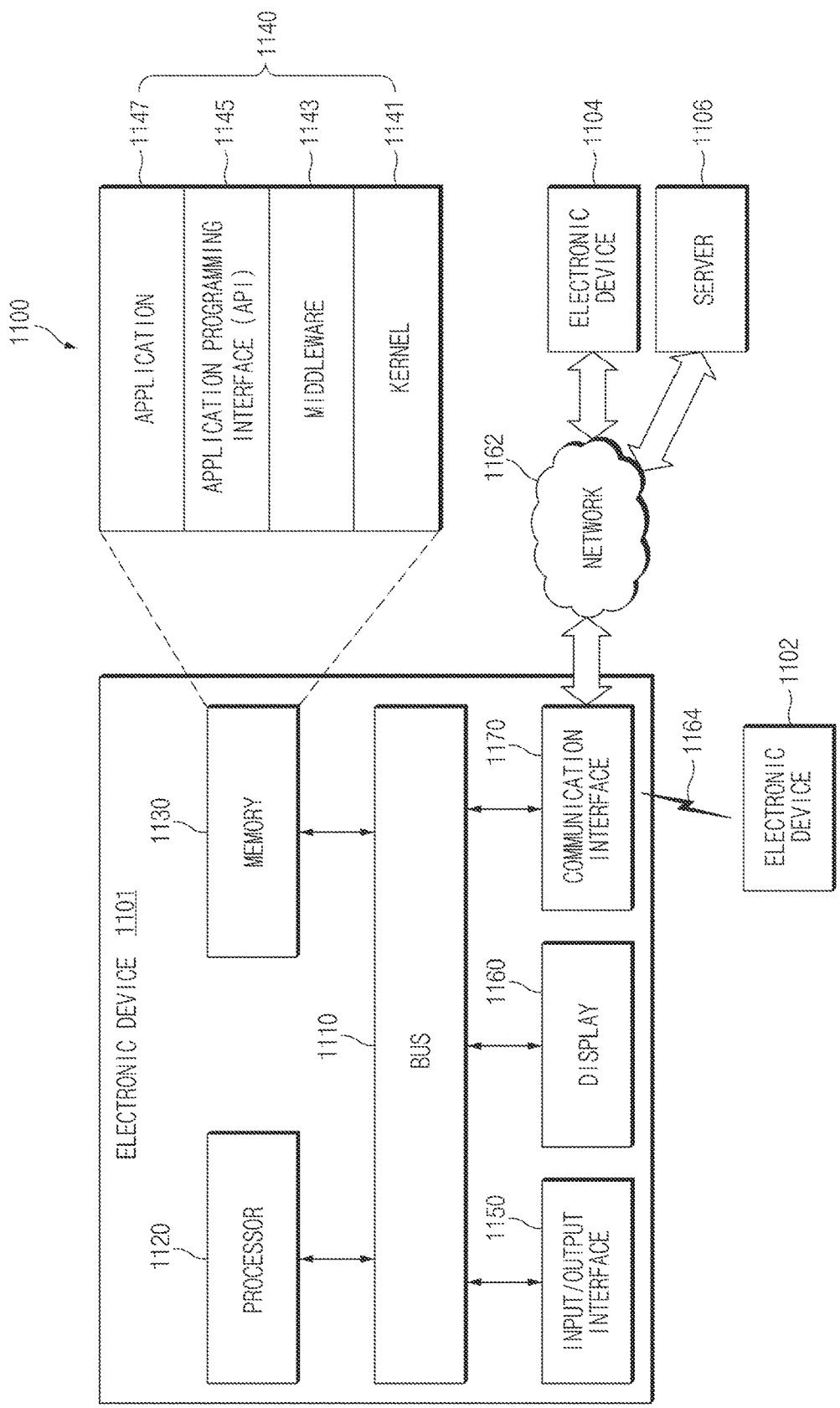
FIG. 11 is a diagram illustrating an electronic device in a network environment according to various embodiments of the present disclosure.

FIG. 11 is a diagram illustrating an electronic device in a network environment according to various embodiments of the present disclosure.

Referring to FIG. 11, there is illustrated an electronic device 1101 in a network environment 1100 according to various embodiments of the present disclosure. The electronic device 1101 may include a bus 1110, a processor 1120, a memory 1130, an input/output interface 1150, a display 1160, and a communication interface 1170. According to various embodiments of the present disclosure, the electronic device 1101 may not include at least one of the above-described components or may further include other component(s).

The bus 1110 may interconnect the above-described components 1110 to 1170 and may be a circuit for conveying communications (e.g., a control message and/or data) among the above-described components.

The processor 1120 may include one or more of a CPU, an AP, or a CP. The processor 1120 may perform, for example, data processing or an operation associated with control or communication of at least one other component(s) of the electronic device 1101. According to various embodiments of the present disclosure, the processor 1120 may correspond to the above-described processing module, an AP 103, or an AP 223.

The memory 1130 may include a volatile and/or nonvolatile memory. The memory 1130 may store instructions or data associated with at least one other component(s) of the electronic device 1101. According to various embodiments of the present disclosure, the memory 1130 may store software and/or a program 1140. The memory 1130 may include, for example, a kernel 1141, a middleware 1143, an application programming interface (API) 1145, and/or an application (or an application program) 1147. At least a portion of the kernel 1141, the middleware 1143, or the API 1145 may be called an "OS".

The kernel 1141 may control or manage system resources (e.g., the bus 1110, the processor 1120, the memory 1130, and the like) that are used to execute operations or functions of other programs (e.g., the middleware 1143, the API 1145, and the application program 1147). Furthermore, the kernel 1141 may provide an interface that allows the middleware 1143, the API 1145, or the application program 1147 to access discrete components of the electronic device 1101 so as to control or manage system resources.

The middleware 1143 may perform a mediation role such that the API 1145 or the application program 1147 communicates with the kernel 1141 to exchange data. Furthermore, with regard to task requests received from the application program 1147, for example, the middle ware 1143 may perform a control (e.g., scheduling or load balancing) on a task request using a method of assigning the priority, which makes it possible to use a system resource (e.g., the bus 1110, the processor 1120, the memory 1130, or the like) of the electronic device 1101, to at least one application.

The API 1145 may be an interface through which the application program 1147 controls a function provided by the kernel 1141 or the middleware 1143, and may include, for example, at least one interface or function (e.g., an instruction) for a file control, a window control, image processing, a character control, or the like.

The I/O interface 1150 may transmit an instruction or data, input from a user or another external device, to other component(s) of the electronic device 1101. Furthermore, the I/O interface 1150 may output an instruction or data, received from other component(s) of the electronic device 1101, to a user or another external device.

The display 1160 may include, for example, a LCD, a light-emitting diode (LED) display, an organic LED (OLED) display, or a microelectromechanical systems (MEMS) display, or an electronic paper display. The display 1160 may display, for example, various contents (e.g., a text, an image, a video, an icon, a symbol, and the like) to a user. The display 1160 may include a touch screen and may receive, for example, a touch, gesture, proximity, or hovering input using an electronic pen or a portion of a user's body.

According to various embodiments of the present disclosure, the display 1160 may have at least two areas that are functionally divided. Furthermore, the areas may be set as corresponding lock windows, respectively. The application program 1147 may be executable at each of the functionally divided areas. In some embodiments, however, as described above, one application may be functionally separated so as to be executable at two different areas, respectively.

The communication interface 1170 may establish communication between the electronic device 1101 and an external electronic device (e.g., an external electronic device 1102, an external electronic device 1104, or a server 1106). For example, the communication interface 1170 may be connected to a network 1162 through wireless communication or wired communication to communicate with the external device (e.g., an external electronic device 1104 or a server 1106). In another example, the communication interface 1170 may be connected through wireless communication or wired communication 1164 to communicate with an external device (e.g., the external electronic device 1102).

An electronic device 1201 and a program module 1310 to be described below with respect to FIGS. 12 and 13 may be understood as being a detailed embodiment or general expansion of an electronic device 200 of FIG. 2 and an electronic device 1101 of FIG. 11 or a program module 1140.

Figure 12:
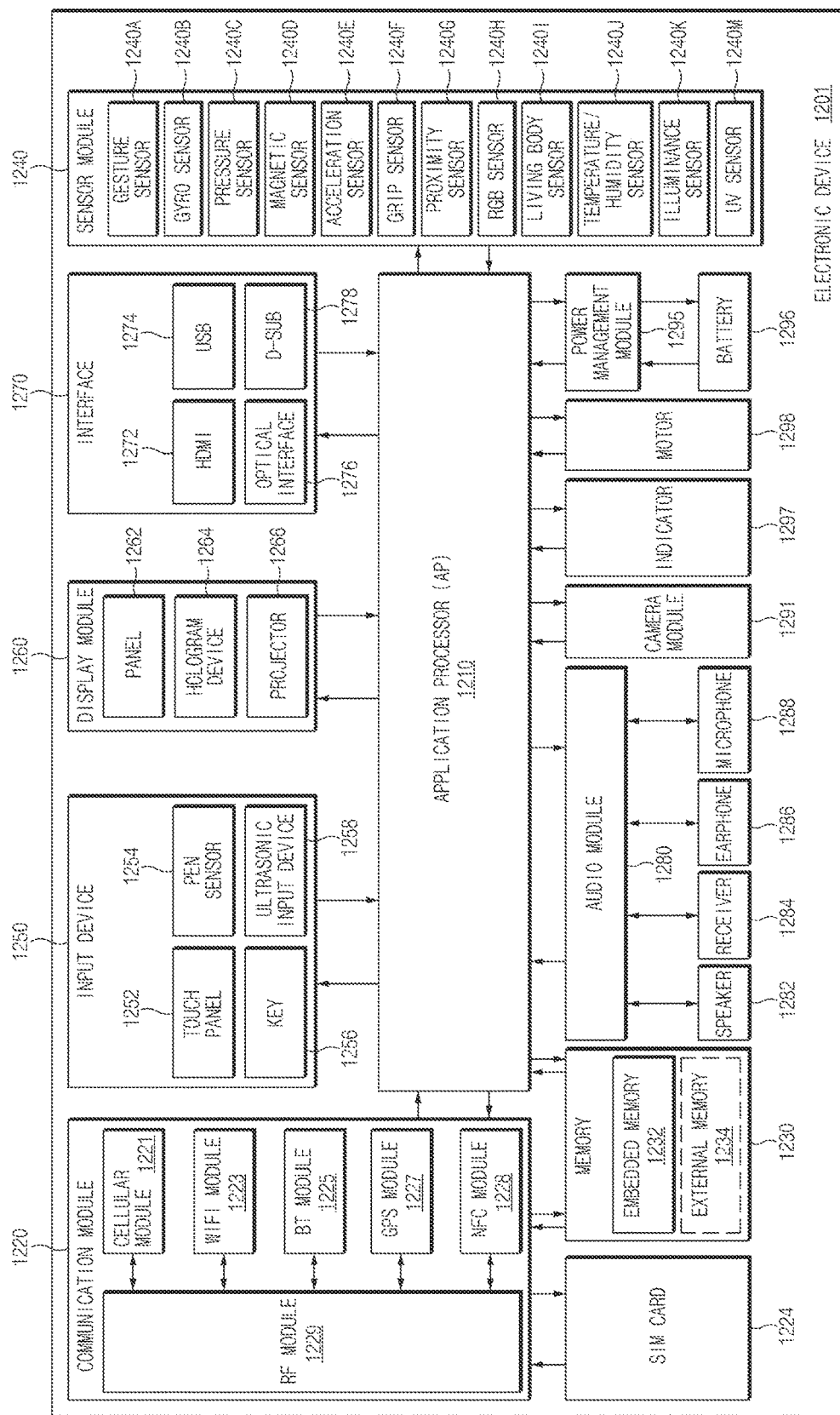
FIG. 12 is a block diagram illustrating an electronic device according to various embodiments of the present disclosure.

FIG. 12 is a block diagram illustrating an electronic device 1201 according to various embodiments of the present disclosure.

Referring to FIG. 12, an electronic device 1201 may include all or a part of an electronic device 1101 illustrated in FIG. 11. The electronic device 1201 may include one or more APs 1210, a communication module 1220, a subscriber identification module (SIM) card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 may drive, for example, an OS or an application to control a plurality of hardware or software components connected to the AP 1210 and may process and compute a variety of data including multimedia data. The AP 1210 may be implemented with an SoC, for example. According to an embodiment of the present disclosure, the AP 1210 may further include a graphic processing unit (GPU) (not illustrated) and/or an image signal processor (ISP). The AP module 1210 may include a part (e.g., a cellular module 1221) of components illustrated in FIG. 12. The AP 1210 may load instructions or data, received from at least one of other components (e.g., a nonvolatile memory), onto a volatile memory and may store various data at a nonvolatile memory.

The communication module 1220 may be configured to be the same as or similar to a communication interface 1170 illustrated in FIG. 11. The communication module 1220 may include a cellular module 1221, a Wi-Fi module 1223, a BT module 1225, a GPS module 1227, a near field communication (NFC) module 1228, and a radio frequency (RF) module 1229.

The SIM card 1224 may include, for example, a card and/or embedded SIM that includes a SIM and may include unique identify information (e.g., integrated circuit card identifier (ICCID)) or subscriber information (e.g., integrated mobile subscriber identity (IMSI)).

The memory 1230 (e.g., a memory 1130) may include an embedded memory 1232 or an external memory 1234. The external memory 1234 may be functionally and/or physically connected to the electronic device 1201 through various interfaces.

The sensor module 1240 may measure a physical quantity or may detect an operation state of the electronic device 1201. The sensor module 1240 may convert the measured or detected information to an electric signal. The sensor module 1240 may include, for example, at least one of a gesture sensor 1240A, a gyro sensor 1240B, a pressure sensor 1240C, a magnetic sensor 1240D, an acceleration sensor 1240E, a grip sensor 1240F, a proximity sensor 1240G, a color sensor 1240H (e.g., red, green, blue (RGB) sensor), a living body sensor 1240I, a temperature/humidity sensor 1240J, an illuminance sensor 1240K, or an ultraviolet (UV) sensor 1240M. The sensor module 1240 may further include a control circuit for controlling at least one or more sensors included therein. According to various embodiments of the present disclosure, the electronic device 1201 may further include a processor which is a part of the AP 1210 or independent of the AP 1210 and is configured to control the sensor module 1240. The processor may control the sensor module 1240 when the AP 1210 remains at a sleep state.

The input device 1250 may include a touch panel 1252, a (digital) pen sensor 1254, a key 1256, or an ultrasonic input unit 1258. The touch panel 1252 may use at least one of capacitive, resistive, infrared and ultrasonic detecting methods. Also, the touch panel 1252 may further include a control circuit. The touch panel 1252 may further include a tactile layer. In this case, the touch panel 1252 may provide a tactile reaction to a user.

The (digital) pen sensor 1254 may be a part of a touch panel or may include a separate sheet for recognition. The key 1256 may include, for example, a physical button, an optical key, a keypad, and the like. The ultrasonic input device 1258, which is an input device for generating an ultrasonic signal, may enable the electronic device 1201 to sense a sound wave through a microphone (e.g., a microphone 1288) so as to identify data.

The display 1260 (e.g., a display 1160) may include a panel 1262, a hologram device 1264, or a projector 1266. The panel 1262 may be configured to be the same as or similar to a display 1160 illustrated in FIG. 11. The panel 1262 may be, for example, flexible, transparent or wearable. The panel 1262 and the touch panel 1252 may be integrated into a single module. According to an embodiment of the present disclosure, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in a communication interface 1170 illustrated in FIG. 11.

The audio module 1280 may convert a sound and an electric signal in dual directions. At least a portion of the audio module 1280 may be included, for example, in an input/output interface 1150 illustrated in FIG. 11. The audio module 1280 may process, for example, sound information that is input or output through a speaker 1282, a receiver 1284, an earphone 1286, or a microphone 1288.

The camera module 1291 for shooting a still image or a video may include, for example, at least one image sensor (e.g., a front sensor or a rear sensor), a lens (not illustrated), an ISP (not illustrated), or a flash (e.g., an LED or a xenon lamp, not illustrated).

The power management module 1295 may manage, for example, power of the electronic device 1201. According to an embodiment of the present disclosure, a power management IC (PMIC) a charger IC, or a battery or fuel gauge may be included in the power management module 1295. The PMIC may have a wired charging method and/or a wireless charging method. The battery gauge may measure, for example, a remaining capacity of the battery 1296 and a voltage, current or temperature thereof while the battery is charged. The battery 1296 may include, for example, a rechargeable battery or a solar battery.

The indicator 1297 may display a specific state of the electronic device 1201 or a part thereof (e.g., the AP 1210), such as a booting state, a message state, a charging state, and the like. The motor 1298 may convert an electrical signal into a mechanical vibration and may generate vibration or a haptic effect.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 13:
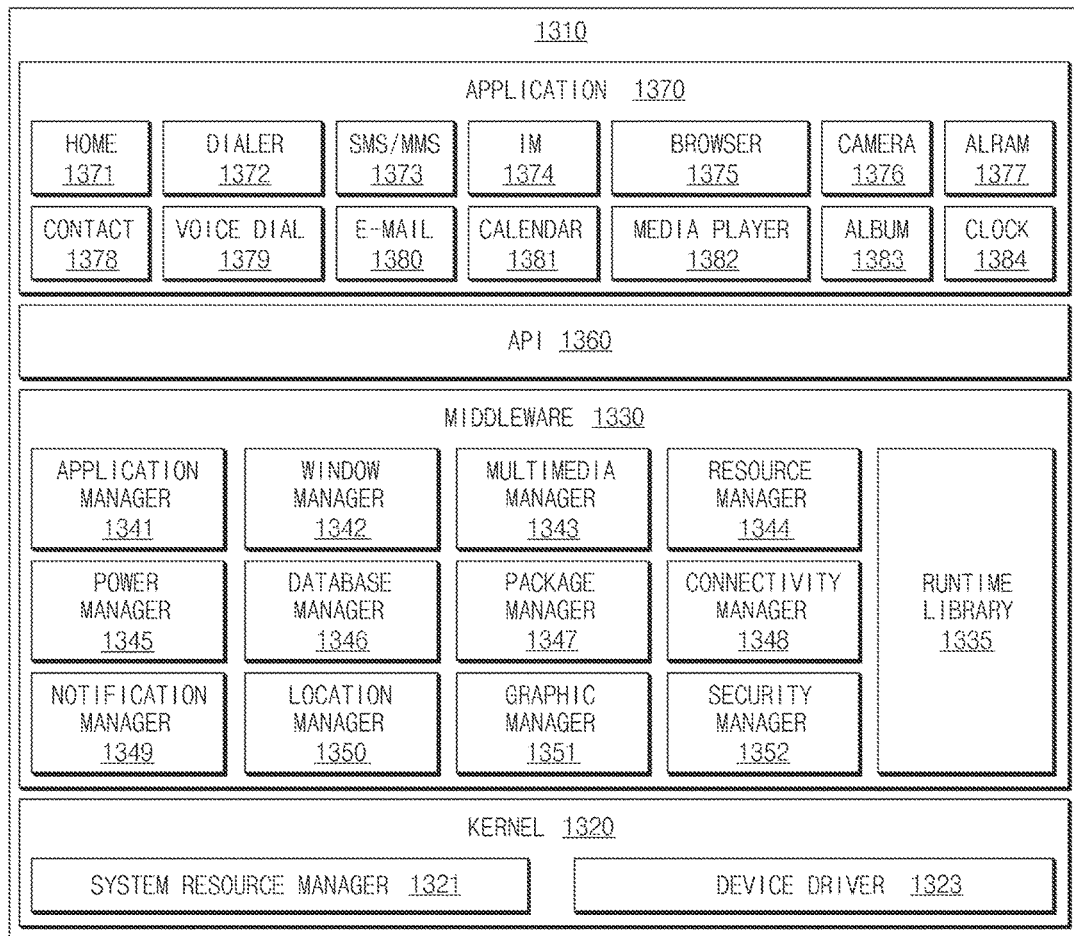
FIG. 13 illustrates a block diagram of a program module according to various embodiments of the present disclosure.

FIG. 13 illustrates a block diagram of a program module 1310 according to various embodiments of the present disclosure.

Referring to FIG. 13, according to an embodiment of the present disclosure, a program module 1310 (e.g., a program 1140) may include an OS to control resources associated with an electronic device (e.g., an electronic device 1101), and/or diverse applications (e.g., an application program 1147) driven on the OS. The OS may be, for example, android, iOS, windows, Symbian, Tizen OS, or Bada OS.

The program module 1310 may include a kernel 1320, a middleware 1330, an API 1360, and/or an application 1370. At least a part of the program module 1310 may be preloaded on an electronic device or may be downloadable from a server (e.g., a server 1106).

The kernel 1320 (e.g., a kernel 1141 of FIG. 11) may include, for example, a system resource manager 1321 or a device driver 1323. The system resource manager 1321 may perform control, allocation, or retrieval of system resources. According to an embodiment of the present disclosure, the system resource manager 1321 may include a process managing part, a memory managing part, or a file system managing part. The device driver 1323 may include, for example, a display driver, a camera driver, a BT driver, a common memory driver, an USB driver, a keypad driver, a Wi-Fi driver, an audio driver, or an inter-process communication (IPC) driver.

The middleware 1330 may provide, for example, a function which the application 1370 needs in common, or may provide diverse functions to the application 1370 through the API 1360 to allow the application 1370 to efficiently use limited system resources of the electronic device. According to an embodiment of the present disclosure, the middleware 1330 (e.g., a middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, or a security manager 1352.

The runtime library 1335 may include, for example, a library module which is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a GUI resource which is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database which is to be used in at least one application of the application 1370. The package manager 1347 may install or update an application which is distributed in the form of package file.

The connectivity manager 1348 may manage, for example, wireless connection such as Wi-Fi or BT. The notification manager 1349 may display or notify an event such as arrival message, promise, or proximity notification in a mode that does not disturb a user. The location manager 1350 may manage location information of an electronic device. The graphic manager 1351 may manage a graphic effect that is provided to a user, or manage a UI relevant thereto. The security manager 1352 may provide a general security function necessary for system security or user authentication. According to an embodiment of the present disclosure, in the case where an electronic device (e.g., an electronic device 1101) includes a telephony function, the middleware 1330 may further includes a telephony manager for managing a voice or video call function of the electronic device.

The middleware 1330 may include a middleware module that combines diverse functions of the above-described components. The middleware 1330 may provide a module specialized to each OS kind to provide differentiated functions. Additionally, the middleware 1330 may remove a part of the preexisting components, dynamically, or may add a new component thereto.

The API 1360 (e.g., an API 1145) may be, for example, a set of programming functions and may be provided with a configuration which is variable depending on an OS. For example, in the case where an OS is the android or the iOS, it may be permissible to provide one API set per platform. In the case where an OS is the Tizen, it may be permissible to provide two or more API sets per platform.

The application 1370 (e.g., an application program 1147) may include, for example, one or more applications capable of providing functions for a home 1371, a dialer 1372, an short message service (SMS)/multimedia messaging service (MMS) 1373, an instant message (IM) 1374, a browser 1375, a camera 1376, an alarm 1377, a contact 1378, a voice dial 1379, an e-mail 1380, a calendar 1381, a media player 1382, am album 1383, and a clock 1384, or for offering health care (e.g., measuring an exercise quantity or blood sugar) or environment information (e.g., atmospheric pressure, humidity, or temperature).

According to an embodiment of the present disclosure, the application 1370 may include an application (hereinafter referred to as "information exchanging application" for descriptive convenience) to support information exchange between the electronic device (e.g., an electronic device 1101) and an external electronic device (e.g., an electronic device 1102 or 1104). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., an electronic device 1102 or 1104). Additionally, the information exchanging application may receive, for example, notification information from an external electronic device and provide the notification information to a user. The device management application may manage (e.g., install, delete, or update), for example, at least one function (e.g., turn-on/turn-off of an external electronic device itself (or a part of components) or adjustment of brightness (or resolution) of a display) of the external electronic device (e.g., an electronic device 1104) which communicates with the electronic device, an application running in the external electronic device, or a service (e.g., a call service or a message service) provided from the external electronic device.

According to an embodiment of the present disclosure, the application 1370 may include an application (e.g., a health care application) which is assigned in accordance with an attribute (e.g., an attribute of a mobile medical device as a kind of electronic device) of the external electronic device (e.g., an electronic device 1102 or 1104). According to an embodiment of the present disclosure, the application 1370 may include an application which is received from an external electronic device (e.g., a server 1106 or an electronic device 1102 or 1104). According to an embodiment of the present disclosure, the application 1370 may include a preloaded application or a third party application which is downloadable from a server. The component titles of the program module 1310 according to the embodiment of the present disclosure may be modifiable depending on kinds of OSs.

According to various embodiments of the present disclosure, at least a part of the program module 1310 may be implemented in software, firmware, hardware, or a combination of at least two or more combinations thereof. At least a part of the program module 1310 may be implemented (e.g., executed), for example, by a processor (e.g., an AP 1210). At least a part of the program module 1310 may include, for example, a module, a protein, a set of instructions, or a process for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a non-transitory computer-readable storage media in the form of a programmable module. The instruction, when executed by one or more processors (e.g., the processor 1120), may perform a function corresponding to the instruction. The non-transitory computer-readable storage media, for example, may be the memory 1230.

A non-transitory computer-readable recording medium may include a hard disk, a magnetic media such as a floppy disk and a magnetic tape, an optical media such as Compact Disc Read Only Memory (CD-ROM) and a DVD, a magneto-optical media such as a floptical disk, and the following hardware devices specifically configured to store and perform a program instruction (e.g., a programming module): ROM, Random Access Memory (RAM), and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

According to various embodiments of the present disclosure, it may be possible to transfer an intended touch input of a user to an application except for an unintended touch input, thereby improving user convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a touch screen including a flat area and a curved area extending from a peripheral edge of the flat area to form a sidewall area of the electronic device, wherein the curved area is functionally divided from the flat area;
   at least one processor; and
   at least one memory storing instructions, which when executed by the at least one processor, cause the electronic device to:
   receive a touch input on the touch screen,
   process the touch input if a location of the touch input is in the flat area, and
   disregard the touch input if the touch input is in the sidewall area and a pre-defined condition is satisfied,
   wherein the pre-defined condition comprises that a duration of the touch input in the sidewall area exceeds a threshold duration, a size of a contact area of the touch input in the sidewall area exceeds a threshold size, and a shape of the contact area matches a predetermined shape.

2. The electronic device of claim 1, wherein the instructions further cause the electronic device to process the touch input based on a lock window corresponding to at least a portion of the sidewall area if the location of the touch input is in the sidewall area.

3. The electronic device of claim 2, wherein the instructions further cause the electronic device to change a state of the lock window into an enable or disable state based on at least one of an execution state of a specific application, a value of a specific sensor included in the electronic device, or a previous user input.

4. The electronic device of claim 3, further comprising:
   an orientation sensor,
   wherein the instructions further cause the electronic device to change the state of the lock window based on a slope of the electronic device detected by the orientation sensor.

5. The electronic device of claim 2, wherein the instructions further cause the electronic device to:
   allow the touch input to be processed at the lock window if the lock window is in an enable state, and allow the touch input to be displayed in the sidewall area if the lock window is in a disable state.

6. The electronic device of claim 2, wherein the instructions further cause the electronic device to change at least one of a state, a size, a shape, or a position of the lock window based on a specific user input.

7. The electronic device of claim 6, wherein the instructions further cause the electronic device to:
set a state of the lock window to an enable state if the touch input is a drag input from the flat area to the sidewall area, and
set a state of the lock window to a disable state if the touch input is a drag input from the sidewall area to the flat area.

8. The electronic device of claim 2, wherein the instructions further cause the electronic device to:
set a state of the lock window to an enable state if the electronic device enters a lock state, and
set the state of the lock window to a disable state if the lock state of the electronic device is released.

9. The electronic device of claim 2, wherein the instructions further cause the electronic device to provide at least one user interface (UI) effect of a text or graphic effect, a vibration effect, or voice information associated with the touch input, in the sidewall area when the touch input is processed at the lock window.

10. The electronic device of claim 1, wherein the instructions further cause the electronic device to allow the touch input to be transferred to an application displayed in the flat area, if the location of the touch input is in the flat area.

11. A method for processing a touch input at an electronic device comprising a touch screen including a flat area and a curved area extending from a peripheral edge of the flat area to form a sidewall area of the electronic device, wherein the curved area is functionally divided from the flat area, the method comprising:
receiving a touch input on the touch screen of the electronic device;
processing the touch input if a location of the touch input is in the flat area; and
disregarding the touch input if the touch input is in the sidewall area and a pre-defined condition is satisfied,
wherein the pre-defined condition comprises that a duration of the touch input in the sidewall area exceeds a threshold duration, a size of a contact area of the touch input in the sidewall area exceeds a threshold size, and a shape of the contact area matches a predetermined shape.

12. The method of claim 11, further comprising:
processing the touch input at a lock window corresponding to at least a portion of the sidewall area when the lock window is in an enable state and the location of the touch input is in the sidewall area; and
transferring the touch input to an application displayed in the sidewall area when the lock window is in a disable state and the location of the touch input is in the sidewall area.

13. The method of claim 12, wherein the processing of the touch input at the lock window comprises:
ignoring the touch input.

14. The method of claim 12, wherein the processing of the touch input at the lock window comprises:
providing an effect indicating that the touch input is not transferred to the application.

15. The method of claim 14, wherein the effect comprises at least one of a vibration effect or a message indicating that the lock window is enabled.

16. The method of claim 12,
wherein the portion of the sidewall area is set as the lock window, and
wherein the processing of the touch input comprises processing a touch input of which a location of the touch input corresponds to a remaining area of the sidewall area other than the portion as a user input.

17. The method of claim 11, wherein the processing of the touch input is performed in the case where there are touch inputs of a number that is more than the number of touch inputs that an application displayed in the flat area is able to recognize.

* * * * *